United States Patent [19]
Bevins

[11] Patent Number: 5,299,652
[45] Date of Patent: Apr. 5, 1994

[54] MOTORCYCLE CONTROLS FOR PHYSICALLY CHALLENGED RIDER

[76] Inventor: John P. Bevins, 9170 Nelson Rd., Longmont, Colo. 80501

[21] Appl. No.: 977,593

[22] Filed: Nov. 17, 1992

[51] Int. Cl.⁵ .................................................. B62M 25/08
[52] U.S. Cl. ................................... 180/219; 180/230; 74/473 R; 303/9.62
[58] Field of Search .............. 280/203; 180/219, 230; 74/335, 473 R, 851, 852; 303/9.62, 9.63

[56] References Cited

U.S. PATENT DOCUMENTS

| | | | |
|---|---|---|---|
| 3,570,636 | 3/1971 | Franz et al. | 74/473 R X |
| 3,667,309 | 6/1972 | Franz et al. | 74/340 |
| 3,894,442 | 7/1975 | Hembree | 74/335 |
| 4,415,056 | 11/1983 | Smith | 280/203 X |
| 4,580,652 | 4/1986 | Turner | 280/203 X |
| 4,626,042 | 12/1986 | Burckhardt | 303/9.64 X |
| 4,726,798 | 2/1988 | Davis | 74/852 X |
| 5,172,603 | 12/1992 | MacInnis | 74/335 |

Primary Examiner—Margaret A. Focarino
Assistant Examiner—Victor E. Johnson
Attorney, Agent, or Firm—Rick Martin

[57] ABSTRACT

Complete shifting and all wheel braking systems are controlled on the handlebars to allow a physically challenged rider to safely operate a motorcycle having a sidecar.

9 Claims, 6 Drawing Sheets

MOTORCYCLE CONTROLS FOR PHYSICALLY CHALLENGED RIDER

FIELD OF THE INVENTION

The present invention relates to handlebar control systems for a motorcycle which enable complete control of the motorcycle without moving the hands from the handlebars.

BACKGROUND OF THE INVENTION

Traditional motorcycle controls utilize a right handlebar throttle, a right handlebar front brake control, a right foot rear brake control, a left handlebar clutch control, and a left foot shift control.

A physically challenged rider without a functional left foot or right foot cannot control at least one essential element of a traditional motorcycle. Paralysis victims suffering from a loss of use of the legs cannot shift or brake the rear wheel of a traditional motorcycle. Additionally, they require a sidecar to balance the motorcycle when stopped.

Known in the art is a suicide shift. In place of a left foot shift lever, a shift lever is mounted adjacent the gas tank. A similar embodiment is a shift lever directly attached to the transmission and pointing upwards adjacent the left leg. While these controls allow shifting a motorcycle by a physically challenged rider, they force the left hand off the handlebar for every shift. This is dangerous, and can cause a loss of control of the motorcycle. Additionally, no known proportioning front, rear and sidecar handbrake system for motorcycles is known in the art.

One other shift mechanism is used by drag racers. The motorcycle is equipped with a small compressed air tank. The tank is switchably connected to a pneumatic actuator rod which is affixed to the shifting lever. A pneumatic engine kill switch is hooked up to the air connection to the pneumatic actuator rod.

In operation during a motorcycle drag race, the racer opens the throttle all the way and keeps it there. For shifting, the racer touches (preferably with his right thumb) the pneumatic actuator switch. The quick bursts of air from the compressed air tank move the actuator rod up the range of gears. During the shift operation, the pneumatic kill switch briefly kills the engine in order to more synchronously merge the transmission gears up their range while the clutch is still engaged. This system provides the starting point for the present invention's adaptation for the physically challenged rider.

A downshift capability is added to the racer's upshift system. An on-board compressor is added to the air tank. Normal clutch operation allows push button up and down shifting of the motorcycle.

A proportional hydraulic single lever brake system is provided to apply braking pressure simultaneously to the front, rear and sidecar brakes with an adjustable proportion of 50% or more to the front brake.

Electronic controls prevent undue battery discharge. Finally, a wheelchair mount is affixed to the rear of the sidecar for the paralyzed rider. The present invention has proved totally functional for a paralyzed rider to safely drive a motorcycle with a sidecar without ever taking his hands off the handlebars.

SUMMARY OF THE INVENTION

The main object of the present invention is to allow the normal shifting of a motorcycle without the use of the feet and without letting go of the handlebars.

Another object of the present invention is to provide a hand-controlled multi-brake control system for a motorcycle.

Another object of the present invention is to provide the above features on a motorcycle having a sidecar.

Another object of the present invention is to provide a wheelchair carrier on a sidecar.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENT

Figure 1:
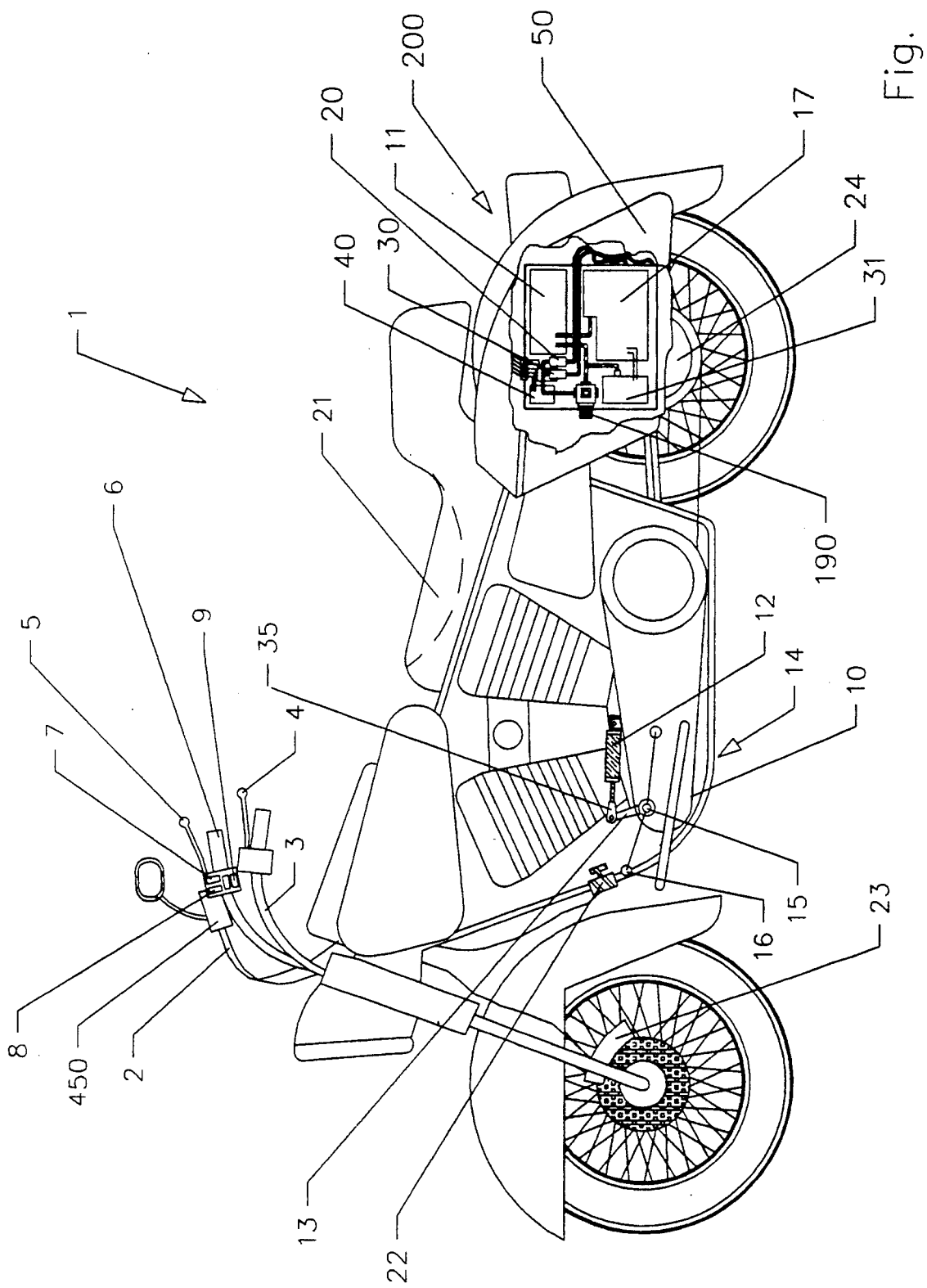
FIG. 1 is a right side plan view of a motorcycle having a handlebar shifting and braking system.

Referring to FIG. 1 a motorcycle 1 has a right handlebar 2, a left handlebar 3, a clutch lever 4, a brake lever 5, a throttle 6, and a shift switch 7. Shift switch 7 further comprises an upshift button 8 and a downshift button 9. In operation the throttle 4 is advanced, then the throttle 4 is lowered while the clutch lever 4 is closed thereby disengaging the clutch 10. The upshift button 8 is depressed thereby discharging a burst of air from tank 11 to actuator 12 and advancing shift arm 13 thus advancing a gear in transmission 14. Downshifting is accomplished in the same manner by pushing downshift button 9. The normal operation of the transmission 14 is not affected. Transmission 14 has a spring-loaded return for shift rod 15 Which causes shift arm 13 to always return to a common return position after either an upshift or a downshift. The foot shift lever 16 follows all the movements of shift arm 13 as it would as if actuated by a foot.

Air compressor 17 maintains the operating pressure of about 100 p.s.i. in the tank 11. The tank 11 output pressure is regulated by regulator 190 as seen in FIG. 2.

Upshift control solenoid 20 is activated by upshift button 8 to release bursts of air from tank 11. A gel cushion seat 21 is provided to improve the circulation of a paralyzed rider.

A two-way proportional valve 22 is pneumatically activated by brake lever 5. Proportional valve 22 simultaneously activates front brake 23 and rear brake 24. The original rear master cylinder (not shown) has been removed.

Figure 2:
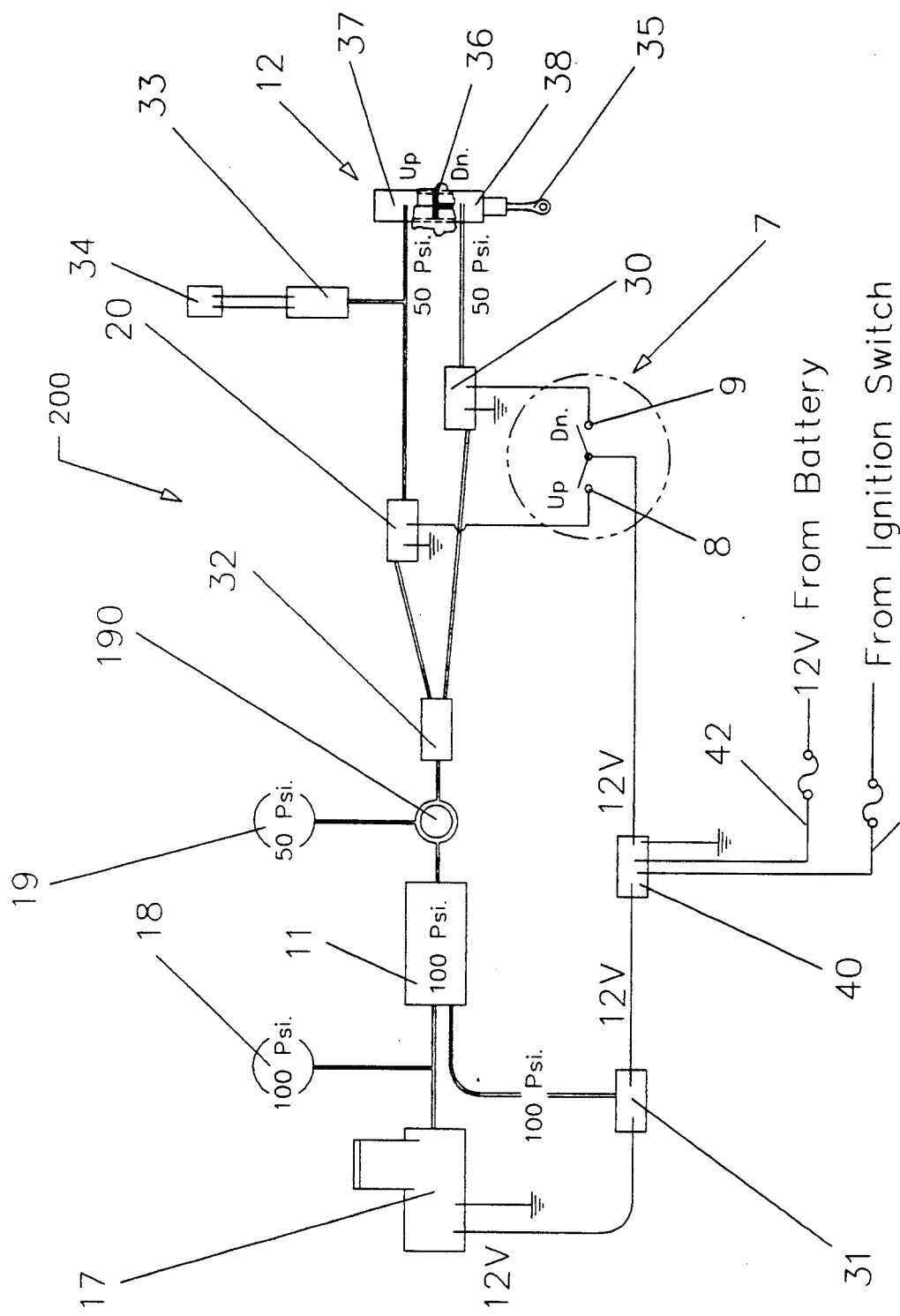
FIG. 2 is a schematic of the handlebar shifting system shown in FIG. 1.

FIG. 2 shows a schematic of the shift control assembly 200 housed in saddlebag 50 of FIG. 1. Wire 41 is powered when the ignition switch is turned on. This activates relay 40 to pass the twelve volt battery power from wire 42 to the pressure controller 31, compressor 17, shift switch 7, upshift control solenoid 20 and downshift control solenoid 30.

In operation upshift button 8 is depressed causing upshift control solenoid 20 to open, thereby allowing a burst of air to flow from tank 11 through junction box 32 to the upper chamber 37 of actuator 12. Thus, the pressure in upper chamber 37 is momentarily greater than the pressure in lower chamber 38 and plunger 36 moves downward forcing arm 35 forward (see also FIG. 1).

Downshifting occurs in the reverse fashion by pushing downshift button 9. Gauges 18, 19 allow for troubleshooting to find leaks as well as to monitor the functioning of regulator 190. Pressure controller 31 controls compressor 17 to maintain pressure from 70 to 100 p.s.i. in tank 11.

An optional pneumatic kill switch 33 is shown in FIG. 2. This option momentarily shuts off the ignition coil 34 during an upshift. By shutting off the ignition (and consequently the engine) upshifting can be accomplished without using the clutch. This would enable a physically challenged person without the ability to depress the clutch lever 4 (FIG. 1) to shift.

Figure 3:
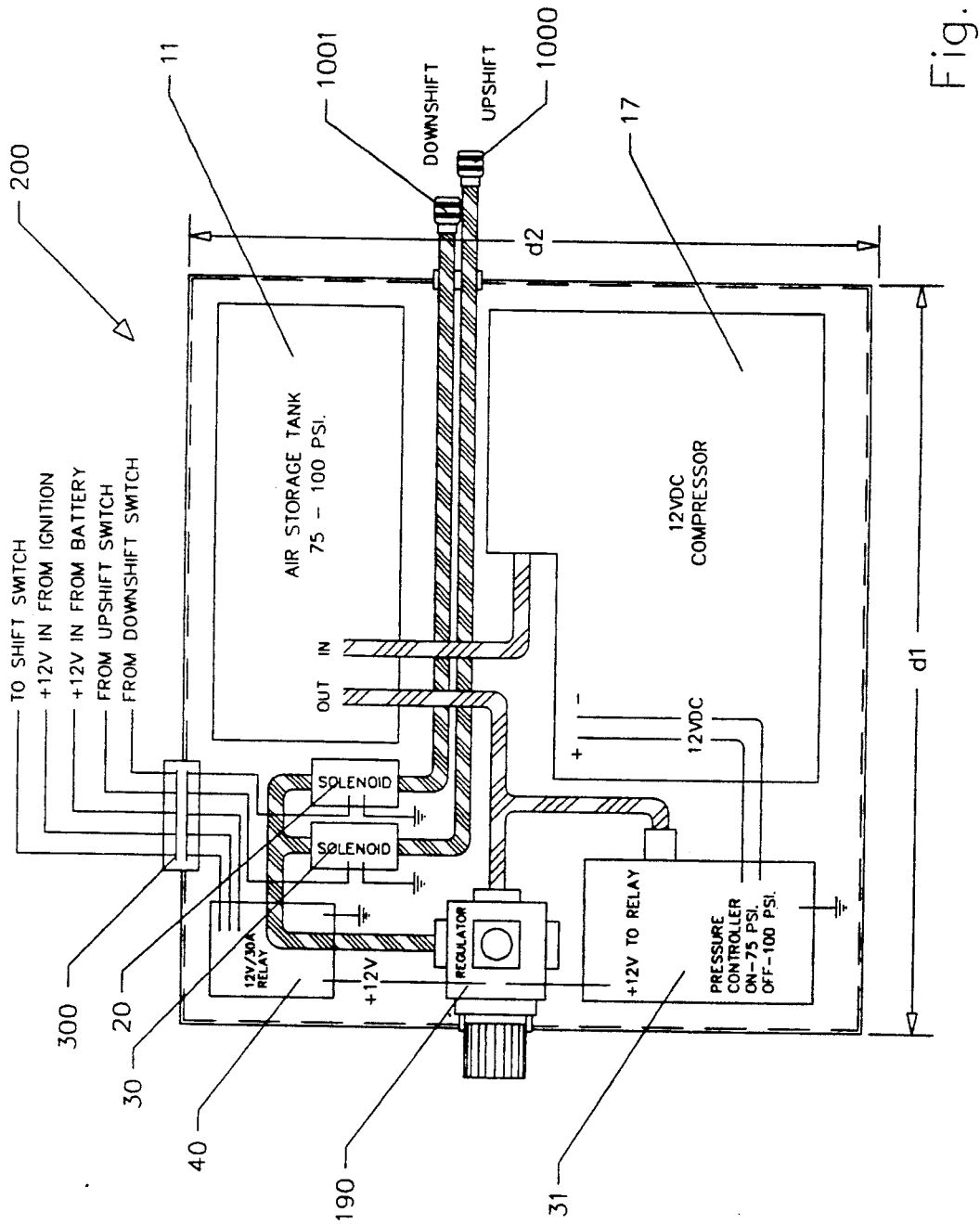
FIG. 3 is a side view of the physical layout of the handlebar shifting system for the sidecar shown in FIGS. 1, 5.
Figure 5:
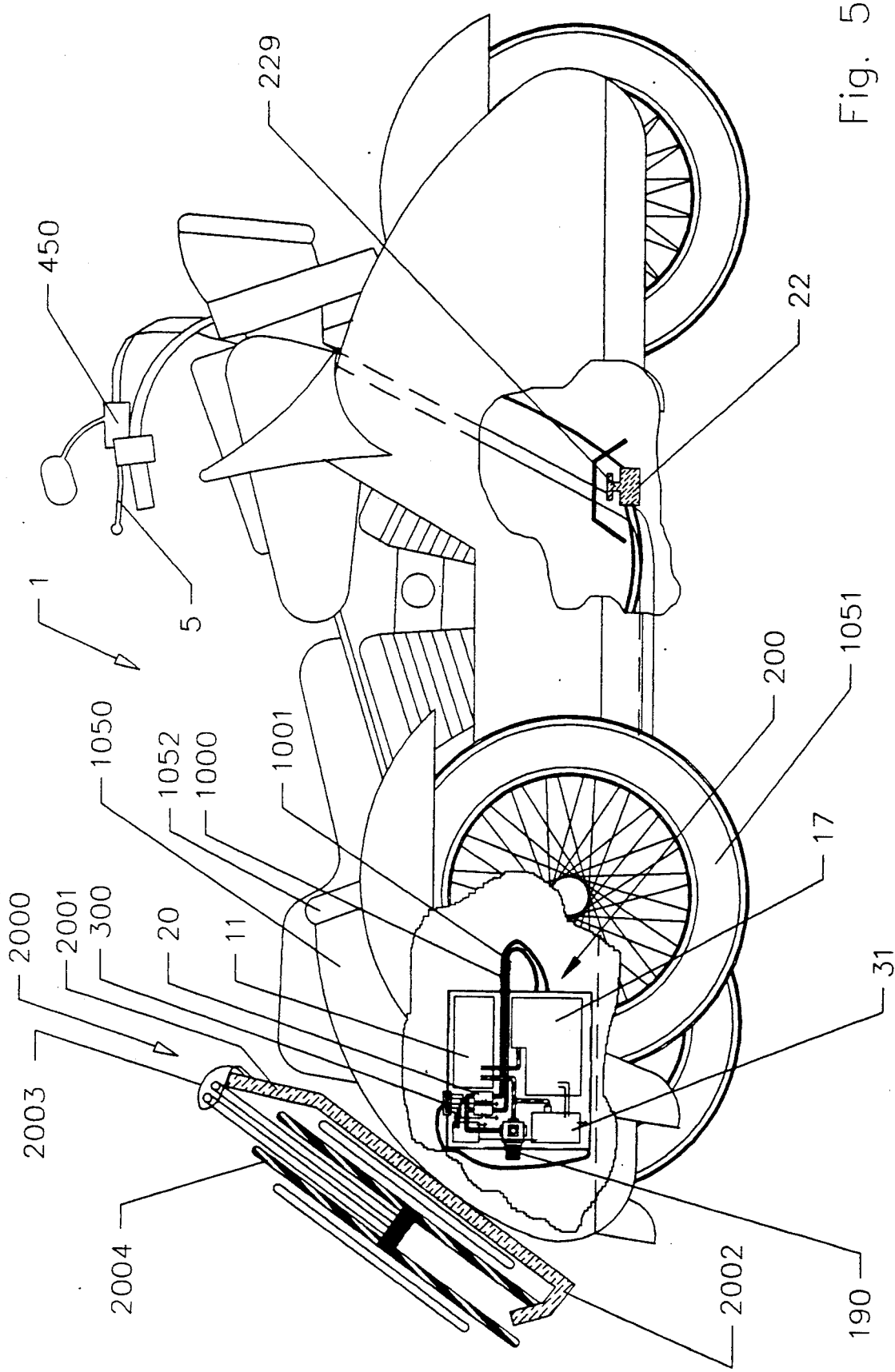
FIG. 5 is a left side plan view of a motorcycle with a sidecar with a partial cutaway of the sidecar.

Referring next to FIG. 3, a typical physical layout of the shift control assembly 200 is shown. $d_1$ is about 11 inches and $d_2$ is about 12 inches. Thus, this layout fits in either a sidecar as shown in FIG. 5 or a saddlebag as shown in FIG. 1. A quick connector 300 allows all electrical inputs and outputs to be quickly attached. Pneumatic quick disconnects 1000, 1001 allow for fast installation and troubleshooting. Mass production of this embodiment for sidecar installation is economically feasible.

Figure 4:
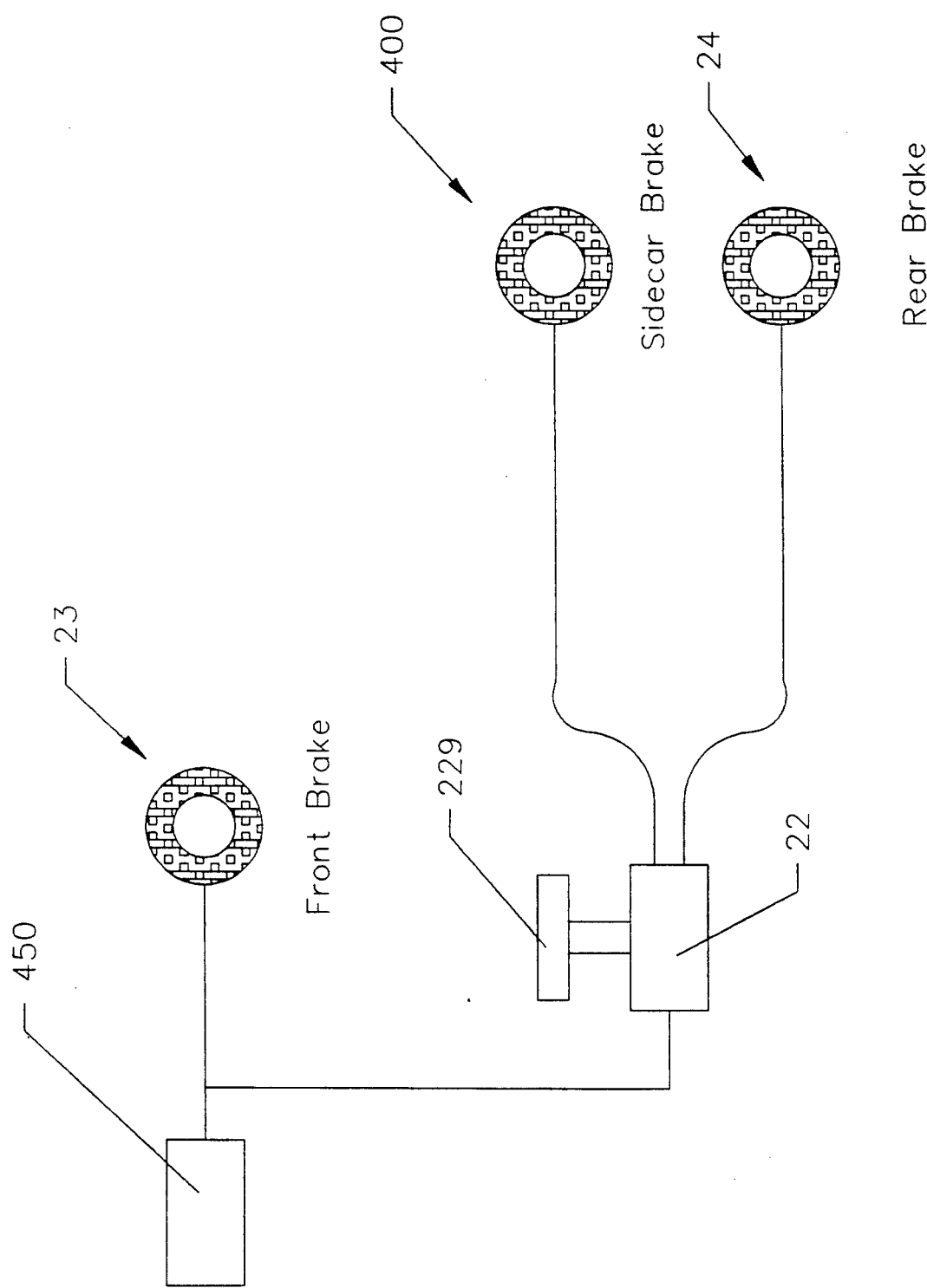
FIG. 4 is a schematic of the handlebar braking system shown in FIGS. 1, 5, 6.

Referring next to FIG. 4, the proportional valve 22 is mounted on the chassis of the motorcycle 1 as seen in FIG. 1. The standard front master cylinder 450 is controlled by the brake lever 5. Proportion adjuster 229 is set by the user for the desired proportioning of braking power. The front brake 23 would normally receive 50% while the rear brake 24 and sidecar brakes 400 would share the remaining 50%. In a panic stop, the front brake 23 provides 70% of the stopping power. Therefore, the user may wish to set the proportion adjuster to 70% for the front brake 23. The original rear brake master cylinder has been replaced by proportioning valve 22. In operation a single depression of brake lever 5 applies all three brakes, front 23, rear 24 and sidecar 400 simultaneously.

Figure 6:
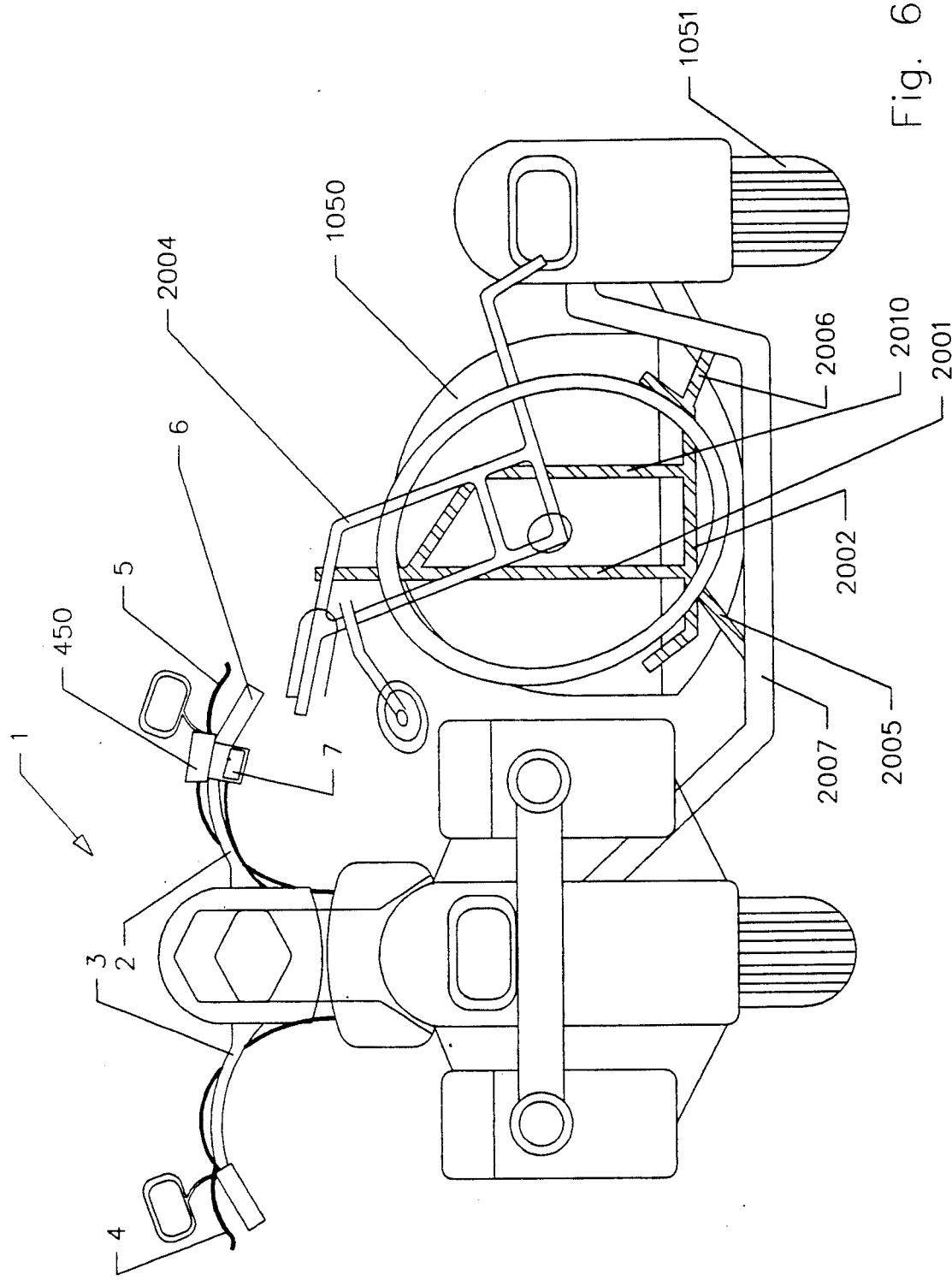
FIG. 6 is a rear plan view of the motorcycle with sidecar shown in FIG. 5.

FIGS. 5, 6 show a sidecar attachment to a motorcycle 1 and the present invention housed in the sidecar 1050. A sidecar 1050 has a tire 1051, a seat 1052 and a shift control assembly 200 mounted behind the seat 1052. The operation is identical to the saddlebag version 200 noted above.

For braking, the same brake lever 5 powers the same front master cylinder 450 which in turn activates the three way proportioning valve 229.

In FIGS. 5 & 6, a wheelchair rack 2000 has vertical supports 2001, 2010, a horizontal support 2002, and a tie down strap 2003 for the wheelchair 2004. Braces 2005 and 2006 are bolted or welded to the sidecar frame 2007.

A physically challenged rider without any use of his legs can operate a motorcycle/sidecar combination with the present invention. Although not shown, it would be obvious to one skilled in the art to adapt the present invention to any motor vehicle capable of being operated by hand controls. Three wheeled power scooters having handlebars are well known in the art.

Although the present invention has been described with reference to preferred embodiments, numerous modifications and variations can be made and still the result will come within the scope of the invention. No limitation with respect to the specific embodiments disclosed herein is intended or should be inferred.

I claim:

1. In a motorcycle having a frame, a front and rear wheel, front and rear brakes, an engine, a manual foot actuated transmission having a gear shifting lever arm, a clutch, a clutch lever, handlebars, and means for brake actuation, the improvement comprising:

a pneumatic shifting assembly;

said pneumatic shifting assembly further comprising a compressor, an air tank, a pressure controller, an output pressure regulator, an actuator having a linkage means connected to said gear shifting lever arm, and release means for releasing air from said tank to said actuator, thereby moving said linkage means to shift said transmission;

said release means further comprising a handlebar mounted upshift and downshift switch, an upshift solenoid, and a downshift solenoid, wherein first activating said clutch lever and then activating said upshift switch causes said upshift solenoid to open thereby causing said release means to release air from said tank through said pressure regulator, thereby upshifting said transmission and further causing said pressure controller to maintain a fixed pressure range in said tank by activating said compressor; and wherein activating said clutch lever and then activating said downshift switch causes said downshift solenoid to open and cause said release means to release air from said tank through said pressure regulator, thereby downshifting said transmission and further causing said pressure controller to maintain a fixed pressure range in said tank by activating said compressor; and said means for brake actuation further comprising a proportioning valve, and a single brake lever on said handlebars, thereby simultaneously operating said front and rear brakes in an adjustable ratio by depressing said brake lever.

2. The improvement of claim 1 wherein said engine further comprises an ignition switch and a battery, and said release means further comprises electric power from said battery via a relay on said ignition switch, said relay functioning to allow said electric power to said release means only when said ignition switch in ON.

3. The improvement of claim 1 wherein said engine further comprises an ignition kill switch, functioning to cause said upshift and downshift solenoids to momentarily switch OFF said ignition, thereby allowing clutchless shifting.

4. The improvement of claim 1 wherein said pressure controller further comprises an operating range of 70–100 p.s.i., and said pressure regulator further comprises an output of approximately 50 p.s.i.

5. The improvement of claim 1 wherein said frame further comprises a sidecar having brakes, and said proportioning valve further comprises means for simultaneously operating said sidecar brakes.

6. The improvement of claim 5 wherein said sidecar further comprises means for mounting a collapsible wheelchair astern.

7. The improvement of claim 6 wherein said means for mounting a collapsible wheelchair astern further comprises a horizontal support bar, a forward leaning vertical strut supported by said support bar, a brace supporting said horizontal support bar, and a support strap.

8. The improvement of claim 5 wherein pneumatic shifting assembly further comprises quick disconnect means for electrical and pneumatic mounting behind a passenger seat in said sidecar.

9. The improvement of claim 1 wherein said pneumatic shifting assembly further comprises quick disconnect means for electrical and pneumatic mounting inside a saddlebag on said frame.

* * * * *